(12) United States Patent
Kanno

(10) Patent No.: US 7,581,114 B2
(45) Date of Patent: Aug. 25, 2009

(54) IMAGE PROCESSING SYSTEM, SCANNER, AND TERMINAL APPARATUS

(75) Inventor: Hiroshi Kanno, Amagasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 615 days.

(21) Appl. No.: 10/702,373

(22) Filed: Nov. 5, 2003

(65) Prior Publication Data

US 2004/0117637 A1 Jun. 17, 2004

(30) Foreign Application Priority Data

Nov. 5, 2002 (JP) .............................. 2002-321581

(51) Int. Cl.
G06F 21/00 (2006.01)
G06K 9/00 (2006.01)
H04N 1/04 (2006.01)

(52) U.S. Cl. ..................... 713/186; 382/115; 382/124; 358/474

(58) Field of Classification Search ......... 713/182–186; 382/115, 124; 358/474
See application file for complete search history.

(56) References Cited

U.S. PATENT DOCUMENTS

| 5,193,855 | A * | 3/1993 | Shamos | 283/117 |
| 6,463,474 | B1 * | 10/2002 | Fuh et al. | 709/225 |
| 6,950,540 | B2 * | 9/2005 | Higuchi | 382/124 |
| 7,308,581 | B1 * | 12/2007 | Geosimonian | 713/186 |
| 2001/0016912 | A1 * | 8/2001 | Takahashi | 713/200 |
| 2003/0043416 | A1 * | 3/2003 | Rublee et al. | 358/402 |
| 2003/0159052 | A1 * | 8/2003 | Lee et al. | 713/186 |
| 2003/0182151 | A1 * | 9/2003 | Taslitz | 705/1 |
| 2004/0010720 | A1 * | 1/2004 | Singh et al. | 713/201 |

FOREIGN PATENT DOCUMENTS

| JP | 11-95921 | 4/1999 |
| JP | 2001-45192 | 2/2001 |
| JP | 2001-045192 | * 2/2001 |

* cited by examiner

*Primary Examiner*—Kimyen Vu
*Assistant Examiner*—Suman Debnath
(74) *Attorney, Agent, or Firm*—David G. Conlin; Steven M. Jensen; Edwards Angell Palmer & Dodge LLP

(57) ABSTRACT

For example, fingerprint information read by a scanner is collated with fingerprint information read by a terminal apparatus used by an operator, so that on the basis of the collation result, the operator is permitted to use this scanner. This configuration allows any operator to use the scanner. Further, the fingerprint information and the like temporarily stored for this collation is deleted on completion of the use of the scanner, so that fingerprint information regarded as important personal information is stored only for a limited duration. This avoids the risk of leakage of the fingerprint information. In conventional image processing systems using fingerprint information, the fingerprint information of operators needed to be registered and stored in advance. This has caused the problem of a risk that the stored fingerprint information leaks to the outside, as well as the problem that the use of the image processing systems is limited to those who have registered their fingerprint information. The present invention has resolved these problems.

8 Claims, 6 Drawing Sheets

FIG. 5C

[SCANNER FUNCTION]
Reservation of scanner is
cancelled because of
time up.
Remove document.

FIG. 5D

[SCANNER FUNCTION]
Document is removed.
Check document.

IMAGE PROCESSING SYSTEM, SCANNER, AND TERMINAL APPARATUS

BACKGROUND OF THE INVENTION

1. Field of the Invention

The present invention relates to an image processing system where when a scanner reads a document image in response to an operation instruction through a terminal apparatus, the reading of the document image is permitted on the basis of the fingerprint information of the operator. The present invention relates further to a scanner and a terminal apparatus constituting such system.

2. Description of the Related Art

There are two types of scanners used in typical image processing systems. One type is a push type where a scanner specifies a terminal apparatus serving as a destination, and transmits a read document image to the terminal apparatus. Another type is a pull type where a terminal apparatus transmits an operation instruction to a scanner, so as to cause the scanner to transmit a read document image to the terminal apparatus.

Further, when such an image processing system is connected to a network, a password inputting scheme is generally used for ensuring the security.

In a conventional push type scanner disclosed, for example, in Japanese Patent Application Laid-Open No. 2001-45192, an operation unit for instructing the reading of a document image is provided with a fingerprint reading unit for reading the fingerprint information of a scanner operator, so that when the operation unit is operated, the fingerprint reading unit reads the fingerprint information of the operator. Then, only when the fingerprint information of the operator matches with one registered in advance, the read document image is transmitted to the terminal apparatus of the operator. This configuration allows the operator to stay on the scanner side and still carry out in one touch the specifying of a destination terminal apparatus and the inputting of a password for ensuring the security.

In a conventional pull type scanner disclosed, for example, in Japanese Patent Application Laid-Open No. H11-95921 (1999), an authentication method is proposed such that only when read fingerprint information matches with one registered in advance, the operator is permitted to operate a computer or connect it to a network.

BRIEF SUMMARY OF THE INVENTION

Nevertheless, in both above-mentioned conventional scanners of push type and pull type, confirmation of the reading conditions of the read image needs to be carried out on the terminal apparatus side. In the above-mentioned apparatus disclosed in Japanese Patent Application Laid-Open No. 2001-45192, the nature of this push type apparatus causes a problem that when the reading conditions (such as resolution and image size) of the read image are not satisfactory, the operator needs to repeat to visit the scanner and carry out the reading operation until a desired image is obtained. Further, the fingerprint information of an operator needs to be registered and stored in a manner corresponded to the terminal apparatus of the operator into a storage unit of a server or the like in advance. This causes a problem that a not-yet registered person cannot use the scanner until the person's fingerprint information is registered and stored.

Further, when the fingerprint information of the operator is registered and stored in the above-mentioned manner, the fingerprint information is continuously retained in the storage unit of the server or the like connected to the network. This situation is not undoubtedly safe in the sense of informational security with considering the present level of network technology. This has caused the problem of a risk that the fingerprint information regarded as important personal information leaks to the outside, as well as its associated problem of the concern owned by the fingerprint registered persons.

In contrast, in the pull type scanner, in general the operator can check the read document image, with staying on the side of the terminal apparatus used for issuing the operation instruction. This causes an advantage that even when the read image are not satisfactory, the operator can easily repeat the reading operation until a desired image is obtained. Nevertheless, the operator needs to issue the operation instruction through the terminal apparatus located distant from the scanner, with setting and leaving the document on the scanner. This has caused the problem of a risk that the document itself is stolen, as well as the problem of a risk that other operators of computers connected to the network can easily read the document image.

The present invention has been devised with considering such situations. A first object of the invention is to improve the security against the theft of image information by configuring the system such that only the first operator having carried out reading operation on the scanner side is permitted to read the document on the scanner through a terminal apparatus.

A second object of the invention is to improve the security by configuring the system such that the above-mentioned document set on the scanner is prevented from being read with other scanners.

A third object of the invention is to provide an image processing system having higher security and operability than conventional similar systems by configuring the present system such that the duration that the fingerprint information regarded as important personal information is stored in the storage unit of a server or the like is shortened as much as possible.

In order to achieve the above-mentioned objects, an image processing system according to the invention is an image processing system including: a scanner for reading a document image; and a terminal apparatus connected to the scanner in a manner permitting communications so as to transmit an operation instruction to the scanner; characterized in that the scanner comprises: first fingerprint information reading means for reading the fingerprint information of an operator; and first fingerprint information storing means for storing temporarily the fingerprint information read by the first fingerprint information reading means; the terminal apparatus comprises: second fingerprint information reading means for reading the fingerprint information of an operator; and second fingerprint information storing means for storing temporarily the fingerprint information read by the second fingerprint information reading means; and both of fingerprint information collating means for collating the fingerprint information stored in the first fingerprint information storing means with the fingerprint information read by the second fingerprint information reading means by means of communications between the scanner and the terminal apparatus; and operation permitting means for permitting the operation of the scanner in response to the operation instruction inputted through the terminal apparatus on the basis of the result of collation in the fingerprint information collating means are provided either in the scanner or in the terminal apparatus, or alternatively any one of the fingerprint information collating means and the operation permitting means is provided in the scanner while the other one is provided in the terminal apparatus.

This configuration of the image processing system according to the invention realizes the authentication of an operator on the basis of the fingerprint information so as to provide an image processing system having high security. Further, this configuration allows any person, not limited to those registered in advance, to use the scanner, so as to provide an image processing system having higher operability. For this purpose, when the collation of the fingerprint information shows matching, the operation permitting means preferably permits the operation of the scanner in response to the operation instruction inputted through the terminal apparatus.

The image processing system according to the invention is preferably characterized in that the scanner comprises: document image reading means for reading document image before receiving the operation instruction; and associated information generating means for generating associated information in which the document image information read by the document image reading means and the fingerprint information read by the first fingerprint information reading means are associated with each other; and associated information storing means connected to the scanner in a manner permitting communications so as to store the associated information generated by the associated information generating means is further included.

In this case, the fingerprint information and the document image are associated with each other. Thus, even when the document itself is stolen, the reading of the image information of the stolen document is prevented on the basis of the fingerprint information associated with the stolen document. This avoids the theft of the document image.

In this case, the image processing system according to the invention is preferably characterized in that either the scanner or the terminal apparatus comprises: associated image information collating means for collating the document image information read by the document image reading means with the image information contained in the associated information of a past time; associated fingerprint information collating means for collating the fingerprint information stored in the first fingerprint information storing means with the fingerprint information contained in the associated information of the past time; and operation inhibiting means for inhibiting the operation of the scanner when the collation by the associated image information collating means matches and the collation by the associated fingerprint information collating means does not match.

This configuration allows only the person having the fingerprint information associated with the image information to read the document corresponding to the associated information. This prevents efficiently a third person from reading the image information.

The image processing system according to the invention may comprise a server provided with associated information storing means.

For example, when the associated information is stored in the server capable of communicating with the scanners or the terminal apparatuses, this configuration prevents a third person from reading the image information of a stolen document by using another scanner.

When the image processing system according to the invention further comprises associated information deleting means for deleting the associated information, this configuration allows the fingerprint information and the like temporarily stored at the time of operation to be deleted on end of the operation. Thus, the fingerprint information regarded as important personal information of the operator is not retained unnecessarily. This avoids the risk of leakage of the fingerprint information, and hence resolves the concern owned by fingerprint information registered persons.

When the document is removed before the end of operation, the associated information deleting means preferably does not delete the associated information generated for the document.

According to this configuration, even when the document is stolen, the associated information of the document is retained. Then, since this associated information is associated also with the fingerprint information, this configuration can prevent a third person with mismatching fingerprint information from reading the image information of the document.

The associated information deleting means may delete the associated information when a predetermined time has elapsed. The purpose of this is to prevent the scanner to be occupied exclusively for a long time by a specific operator. When the predetermined time has elapsed, the scanner operation is interrupted forcedly so that such long-time exclusive occupation is avoided. This realizes smooth operation of the image processing system.

These problems can be resolved also by a scanner described below. That is, a scanner according to the invention is a scanner connected to a terminal apparatus in a manner permitting communications so as to receive an operation instruction for reading a document image, characterized by comprising: fingerprint information reading means for reading a fingerprint information of an operator; fingerprint information storing means for temporarily storing the fingerprint information read by the fingerprint information reading means; fingerprint information collating means for collating the fingerprint information read by the fingerprint information reading means with a fingerprint information acquired by the terminal apparatus by means of communications with the terminal apparatus; and operation permitting means for permitting the operation in response to the operation instruction inputted through the terminal apparatus on the basis of the result of collation by the fingerprint information collating means.

These problems can be resolved also by a terminal apparatus described below. That is, a terminal apparatus according to the invention is a terminal apparatus connected to a scanner in a manner permitting communications so as to transmit an operation instruction for causing the scanner to read a document image, characterized by comprising: fingerprint information reading means for reading a fingerprint information of an operator; fingerprint information storing means for temporarily storing the fingerprint information read by the fingerprint information reading means; fingerprint information collating means for collating a fingerprint information acquired by the scanner with the fingerprint information read by the fingerprint information reading means by means of communications with the scanner; and operation permitting means for permitting the operation of the scanner in response to the inputted operation instruction on the basis of the result of collation in the fingerprint information collating means.

The above and further objects and features of the invention will more fully be apparent from the following detailed description with accompanying drawings.

BRIEF DESCRIPTION OF THE SEVERAL
VIEWS OF THE DRAWINGS

FIG. 5A through FIG. 5D are schematic diagrams showing an example of configuration and display of an operation panel of a scanner X of first and second embodiments of an image processing system according to the invention.

DETAILED DESCRIPTION OF THE PREFERRED EMBODIMENTS

Preferred embodiments of the invention are described below with reference to the attached drawings. The embodiments described below are merely illustrative and hence do not restrict the subject matter of the invention.

Figure 1:
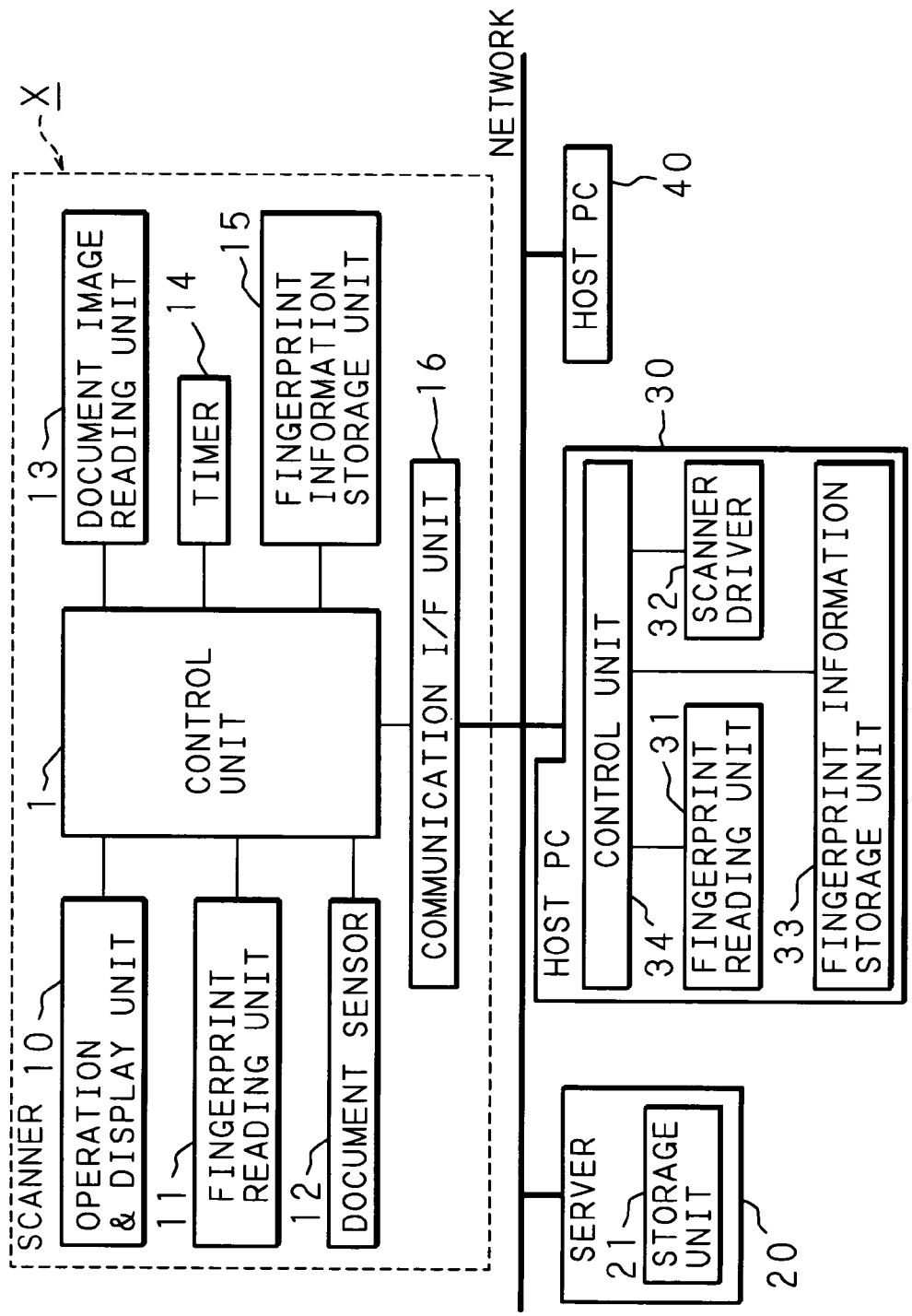
FIG. 1 is a block diagram showing an example of configuration of first and second embodiments of an image processing system according to the invention.
Figure 2:
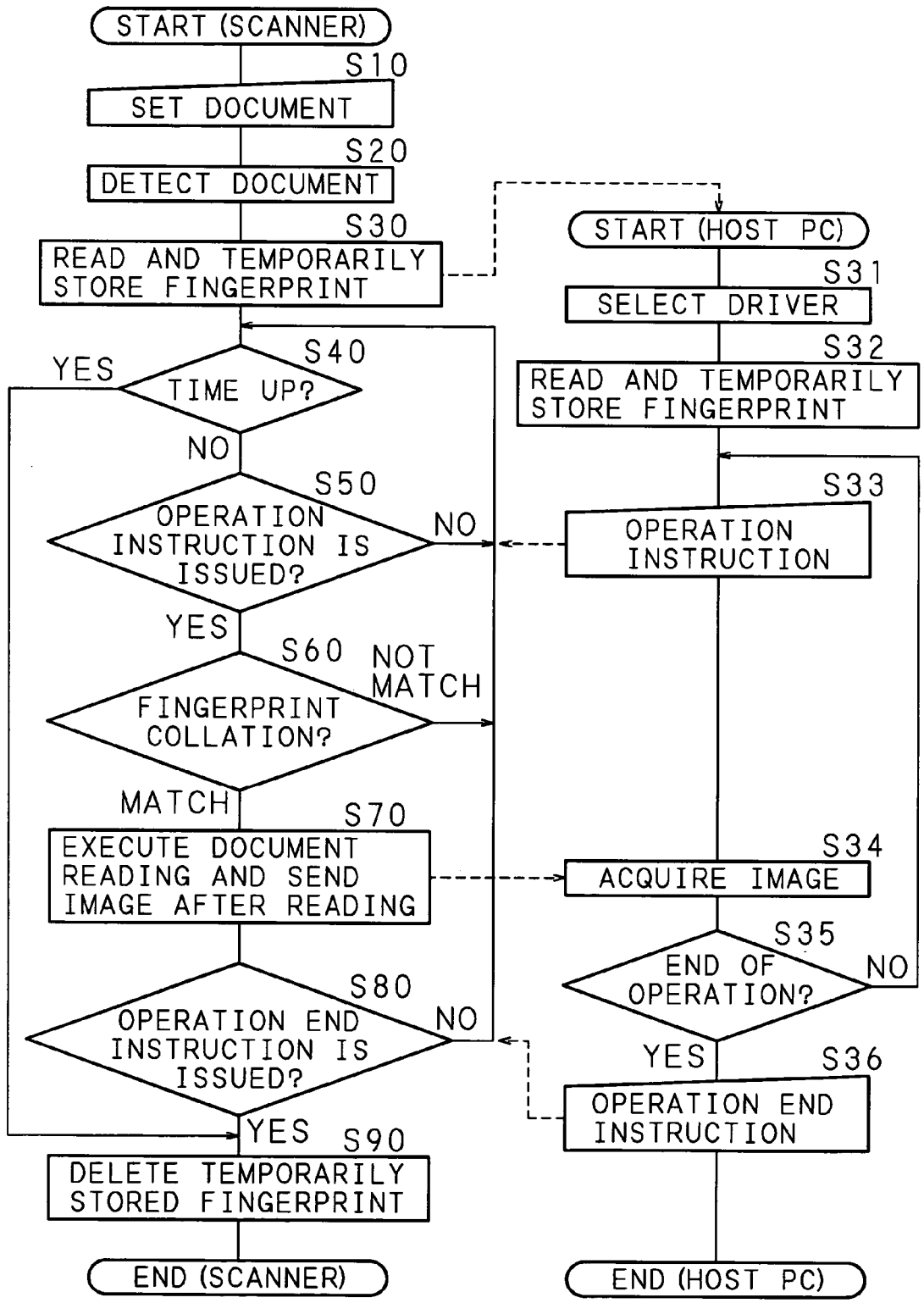
FIG. 2 is a flowchart of the procedure of reading a document image performed by first embodiment of an image processing system according to the invention.
Figure 3:
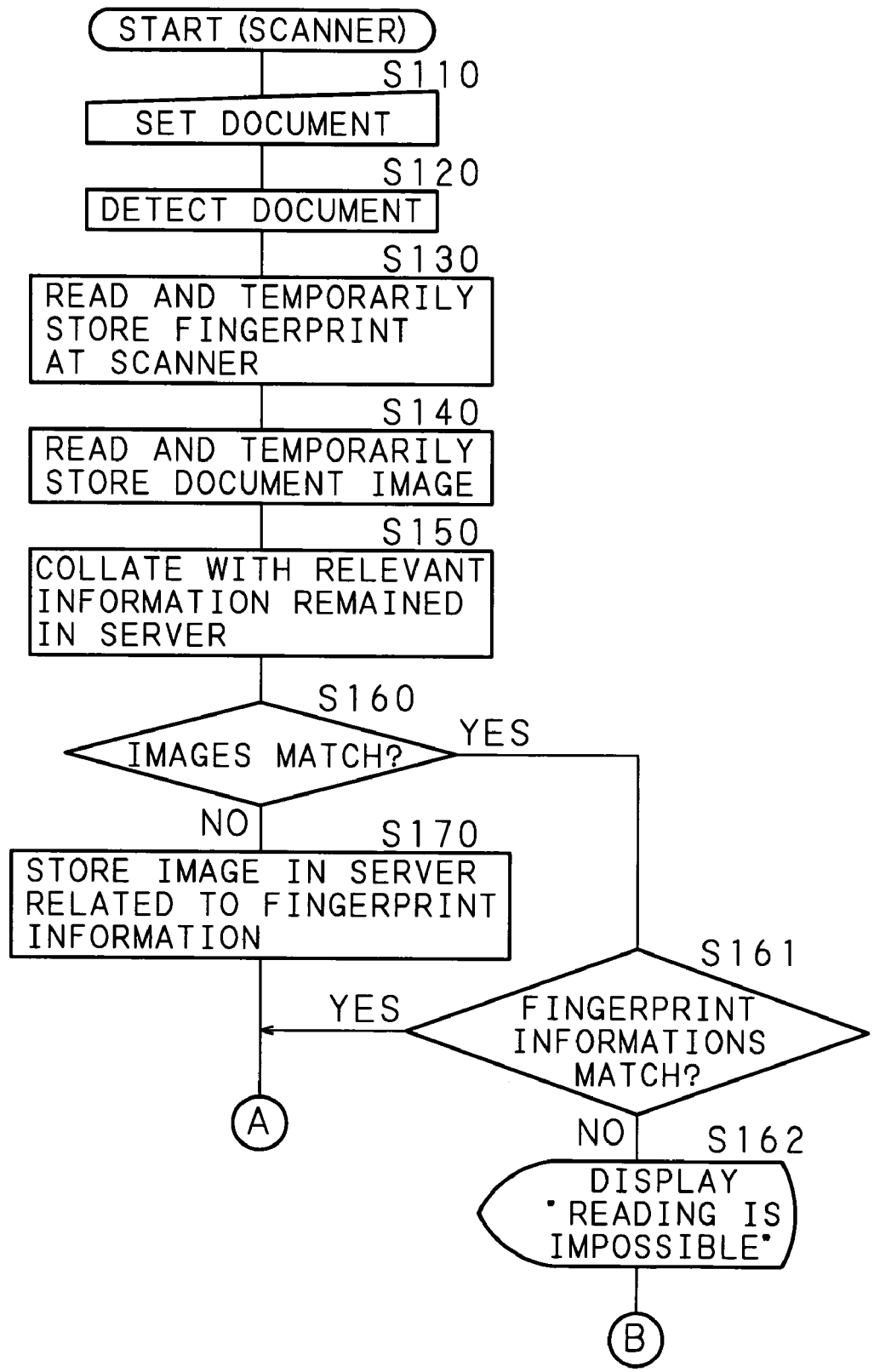
FIG. 3 is a part of a flowchart of the procedure of reading a document image performed by second embodiment of an image processing system according to the invention.
Figure 4:
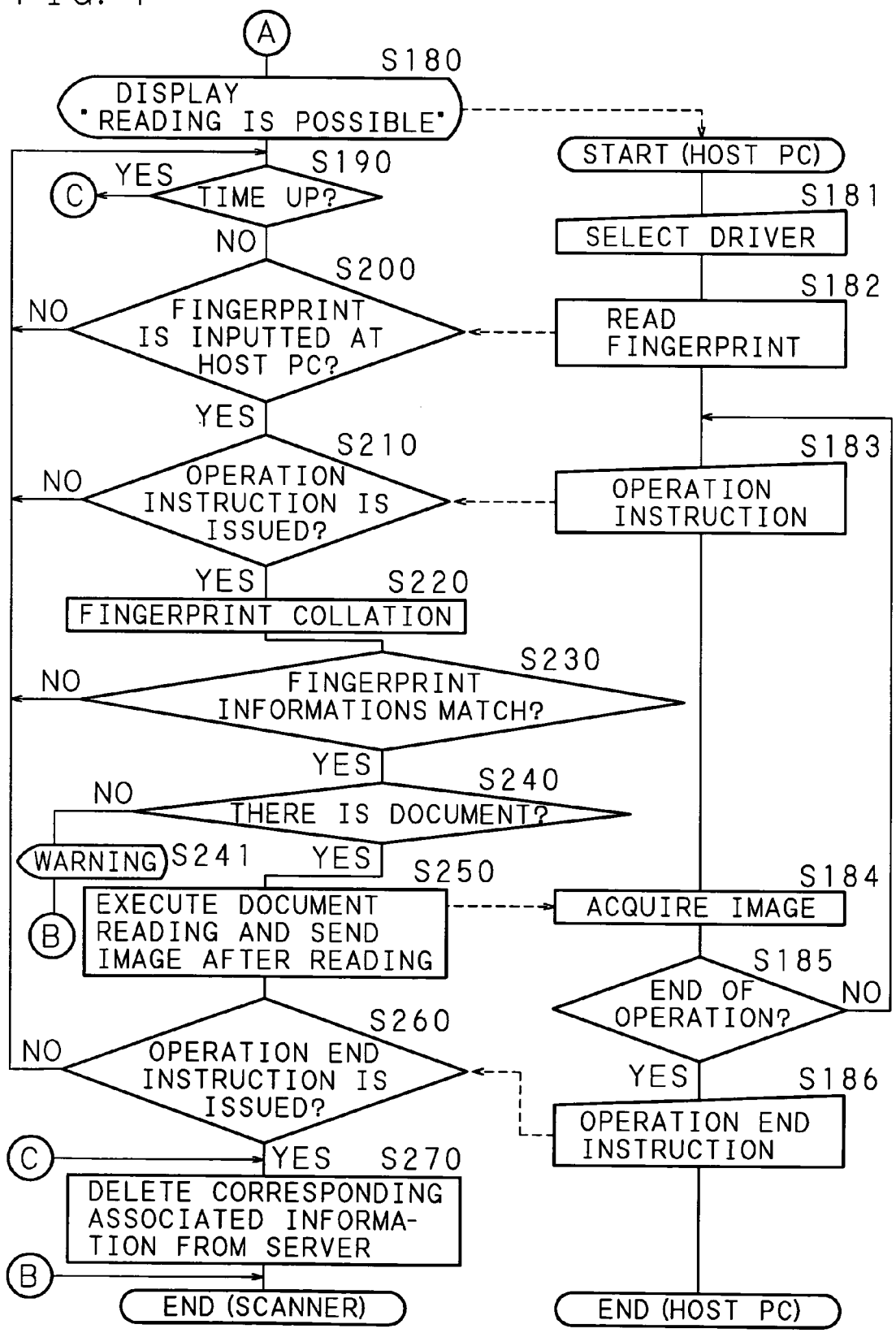
FIG. 4 is a part of a flowchart of the procedure of reading a document image performed by second embodiment of an image processing system according to the invention.

FIG. 1 is a block diagram showing an example of configuration of the first and second embodiments of an image processing system according to the invention. FIG. 2 is a flowchart of the procedure of reading a document image performed by first embodiment of an image processing system according to the invention. FIG. 3 and FIG. 4 are a flowchart of the procedure of reading a document image performed by second embodiment of an image processing system according to the invention. FIG. 5 shows diagrams illustrating an example of an operation panel of a scanner X of the first and second embodiments of an image processing system according to the invention.

First, an example of configuration of the first and second embodiments of an image processing system according to the invention is described below with reference to FIG. 1.

In the image processing system according to the invention, a scanner X, a server 20, and host computers (host PC, hereafter) 30 and 40 are connected to a network in a state permitting mutual communications.

The server 20 comprises a storage unit 21 for storing associated information and the like, and controls and manages various terminal apparatuses connected to the network.

Each of the host PC 30 and 40 serves as an example of a terminal apparatus, and comprises: a fingerprint reading unit 31 (an example of second fingerprint information reading means) for reading the fingerprint of an operator; a fingerprint information storage unit 33 (an example of second fingerprint information storing means) for temporarily storing the fingerprint information read by the fingerprint reading unit 31; a scanner driver 32 for transmitting an operation instruction to the scanner X; a control unit 34 including a CPU having the function of reading fingerprint information using the fingerprint reading unit 31, and the like. Each of the host PC 30 and 40 transmits a instruction (operation instruction, hereafter) for causing the scanner X to read a document image on the basis of reading conditions specified by an operator and then transmit the read document image information to a host PC operated by the operator.

The fingerprint reading unit 31 reads at least the fingerprint information of an operator on the host PC 30 side, and may be composed of a mouse with fingerprint detecting unit as disclosed, for example, in Japanese Patent Application Laid-Open No. H11-95921 (1999). The fingerprint information storage unit 33 temporarily stores the fingerprint information, and may be composed of a rewritable nonvolatile memory (such as EEPROM and flash memory).

The scanner X comprises: an operation and display unit 10 for displaying messages indicating that the setting is released and document reading is permitted; a fingerprint reading unit 11 (an example of first fingerprint information reading means) for reading a fingerprint of an operator; a fingerprint information storage unit 15 (an example of first fingerprint information storing means) for temporarily storing the fingerprint information read by the fingerprint reading unit 11; a document image reading unit 13 (an example of document image reading means) for reading a document that is set; a document sensor 12 for detecting whether a document is set on the document image reading unit 13; a timer 14 for time counting a predetermined duration of time starting from the time point that the reading of a document image is possible; a communications interface (I/F) unit 16; and a control unit 1. The control unit 1 controls these constituent elements in this configuration, so as to perform a fingerprint information reading function (the function implemented through the first fingerprint information reading means), a fingerprint information storing function (the function implemented through the first fingerprint information storing means), a fingerprint information collating function (the function implemented through the fingerprint information collating means), and an operation permitting function (the function implemented through the operation permitting means).

These functions performed by the control unit 1 of the scanner X are described below.

The fingerprint information reading function implemented through the first fingerprint information reading means is that the scanner X reads at least the fingerprint information of an operator. More specifically, this function is to cause the fingerprint reading unit 11 provided, for example, in the operation panel (see FIG. 5A) of the scanner X to read the fingerprint.

The fingerprint information storing function implemented through the first fingerprint information storing means is to temporarily store the fingerprint information read by the fingerprint reading unit 11. More specifically, this function uses a part of the storage region in the fingerprint information storage unit 15 composed, for example, of a rewritable nonvolatile memory.

The fingerprint information collating function implemented through the fingerprint information collating means is that the fingerprint information stored in the fingerprint information storage unit 15 of the scanner X is collated with the fingerprint information stored in the fingerprint information storage unit 33 of the host PC, and that whether these pieces of fingerprint information match with each other is determined, for example, by software.

The operation permitting function implemented through the operation permitting means is to judge whether the operation of the scanner X in response to an operation instruction inputted through the host PC 30 or 40 is to be permitted, on the basis of the result of the above-mentioned collation of the fingerprint information. More specifically, this is a software function of permitting the operation of the scanner X when the result of the above-mentioned collation shows the matching of the fingerprint information.

The control unit 1 of the scanner X is further provided with a document image reading function (the function implemented through the document image reading means), an associated information generating function (the function implemented through the associated information generating means), and an associated information storing function (the function implemented through the associated information storing means).

The document image reading function is that the document image reading unit 13 reads a document image before the scanner X receives an operation instruction. The associated information generating function is to generate information (associated information) where the document image information read by the document image reading unit 13 and the fingerprint information read by the fingerprint reading unit 11 are associated with each other. The associated information storing function is to store this associated information. These functions are used for performing the image processing of the steps S40 through S70 in a flowchart described later, so as to prevent the theft of the document image information.

Furthermore, the control unit 1 of the scanner X is provided with an associated information deleting function (the function implemented through the associated information deleting means). The associated information deleting function is to delete the associated information in response to an operation end instruction after the collation of the fingerprint information. This function is used for deleting the fingerprint information and the like stored in the fingerprint information storage unit after the end of operation of the scanner X, so as to avoid the risk of the leakage of the fingerprint information regarded as important personal information.

An example of the procedure of reading a document image performed by an image processing system according to the invention is described below with reference to FIG. 2. The procedure shown in FIG. 2 is divided generally into two groups: a group of procedure steps (S10, S20, . . .) performed on the scanner X side and a group of procedure steps (S31 through S36) performed on the host PC 30 side.

These numerals S10, S20, . . . indicate procedure sequence (step) numbers. The procedure starts at step S10.

The following description is made for the case that an operator brings a document to the scanner X, and that the data is received by the host PC 30.

Figure 5A:
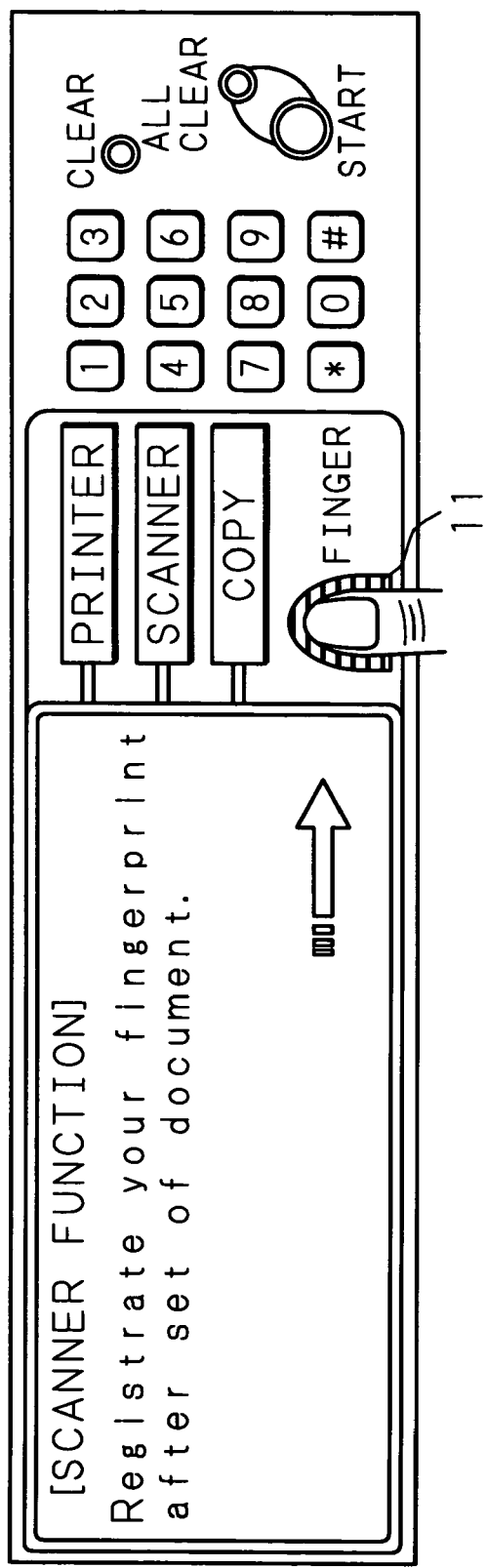

When the operator sets a document onto the document image reading unit 13 of the scanner X (S10), the control unit 1 of the scanner X detects that the document has been set, by means of the document sensor 12 (S20). Then, the control unit 1 starts the reading of the fingerprint information of the operator. The fingerprint information is read (S30) when the fingerprint of a specific finger of the operator is contacted to the fingerprint reading unit 11 provided, for example, in the operation panel of the operation and display unit 10 of the scanner X as shown in FIG. 5A. This read fingerprint information thus read is temporarily stored in the fingerprint information storage unit 15 of the scanner X (S30).

On completion of the process (S30) of reading and storing the fingerprint information, the operator leaves the scanner X and goes to the host PC 30, so as to give an operation instruction from the host PC 30 to the scanner X.

The operator selects the scanner driver at the host PC 30 (S31), and then causes the host PC 30 to read the operator's own fingerprint information (S32). The read fingerprint information is temporarily stored in the fingerprint information storage unit 33 of the host PC 30 (S32). Here, the fingerprint information is read when the fingerprint of the operator is contacted to the fingerprint reading unit 31 of the host PC 30 composed, for example, of a mouse with fingerprint detecting unit as disclosed in Japanese Patent Application Laid-Open No. H11-95921 (1999). Then, the operator transmits an operation instruction from the host PC 30 to the scanner X (S33), so as to start the reading of the document image. This operation instruction transmitted in step S33 is executed preferably at the same time as the reading of the fingerprint information performed in step S32. This eliminates the inputting work of the operation instruction, and hence improves the operability.

The control unit 1 of the scanner X judges whether the fingerprint information has been read in the host PC 30 in step S32 and whether the operation instruction has been inputted in step S33 (S50). When it is judged that both of the fingerprint information and the operation instruction have been inputted, the control unit 1 of the scanner X collates the fingerprint information read at the scanner X in step S30 with the fingerprint information read at the host PC 30 in step S32 (S60). When both pieces of the fingerprint information match with each other in step S60, it is concluded that the exact operator having set the document onto the scanner X is operating the scanner X through the host PC 30. In this case, on confirming that the document is present on the document image reading unit 13 by means of the document sensor 12, the control unit 1 of the scanner X starts the reading of the document image on the basis of reading conditions specified by the operator. On completion of the reading, the control unit 1 transmits the read document image information to the host PC 30 having issued the reading operation instruction (S70).

The detection of the document by the document sensor 12 is continued until the operation end instruction is judged to be issued in step S80 described later. This confirms that the reading is performed under the reading conditions desired by the operator.

The document image information transmitted in step S70 is received by the host PC 30 (S34). The operator of the host PC 30 checks the image and, when desired image is acquired, completes the operation (S35). In this case, an operation end instruction is transmitted from the host PC 30 to the scanner X (S36). When the operation end instruction is transmitted, the control unit 34 of the host PC 30 deletes the fingerprint information of the operator from the fingerprint information storage unit 33. On the other hand, when the scanner X receives the operation end instruction (S80), the control unit 1 of the scanner X deletes the fingerprint information of the operator from the fingerprint information storage unit 15 (S90). As such, the image processing for reading the document by the scanner X and transmitting the image to the host PC 30 complete.

The timer 14 provided in the scanner X starts time counting operation at the time point when the fingerprint information is read in step S30, and continues the time counting until the operation end instruction is judged to be issued in step S80. When a predetermined time has elapsed, a series of the above-mentioned image processing is interrupted forcedly at the time point of the completion of the step S90.

In the above-mentioned embodiment, the two pieces of the fingerprint information read respectively by the scanner X and the host PC 30 are stored respectively in the fingerprint information storage units 15 and 33 of these apparatuses. However, different configuration is also possible in second embodiment as follows.

For example, the two pieces of the fingerprint information read respectively by the scanner X and the host PC 30 may both be stored in the storage unit 21 of the server 20 (see FIG. 1) capable of communicating with both of the scanner X and the host PC 30. In this case, the fingerprint information read by the scanner X and the document image read by the document image reading unit 13 may be associated with each other, and then stored in the storage unit 21 of the server 20.

The procedure of reading a document image performed in an image processing system having such a configuration according to second embodiment of the invention is described below with reference to FIG. 3 and FIG. 4. The procedure shown in FIG. 3 and FIG. 4 is divided generally into two groups: a group of procedure steps (S110, S120, . . . ) performed on the scanner X side and a group of procedure steps (S181 through S186) performed on the host PC 30 side.

The procedure starts at step S110.

The following description is made for the case that an operator brings a document to the scanner X, and that the data is received by the host PC 30.

When the operator sets a document onto the document image reading unit 13 of the scanner X (S110), the control unit 1 of the scanner X detects that the document has been set, by means of the document sensor 12 (S120). Then, the control unit 1 starts the reading of the fingerprint information of the operator. The fingerprint information is read (S130) when the fingerprint of a specific finger of the operator is contacted to the fingerprint reading unit 11 provided, for example, in the operation panel of the operation and display unit 10 of the scanner X as shown in FIG. 5A. This read fingerprint information thus read is transmitted to the server 20, and then temporarily stored in the storage unit 21 thereof (S130).

On completion of the process (S130) of reading and storing the fingerprint information, the control unit 1 of the scanner X once scans and reads the document having been set on the document image reading unit 13. Similarly to the fingerprint information, the read document image is transmitted to the server 20, and then temporarily stored in the storage unit 21 thereof (S140). The reading of the document image in step S140 is executed preferably at the same time as the reading of the fingerprint information of the operator in step S130. This realizes reading of the fingerprint information and the document image by one-step procedure.

The fingerprint information and the document image read in steps S130 and S140 are collated with past associated information having been generated using the associated information generating function provided in the control unit 1 of the scanner X (S150). More specifically, it is judged whether the document image read in step S140 matches with image information contained in associated information generated in the past. When the document image does not match with image information contained in any past associated information (S160), the control unit 1 associates the fingerprint information of the operator read in step S130 with the document image information read in step S140 by using the associated information generating function provided in the control unit 1, and then transmits the associated information to the server 20 so as to store the associated information into the storage unit 21 thereof (S170). Then, the procedure goes to step S180.

In the above-mentioned first embodiment, the associated information is stored in the scanner X. Accordingly, it had not been avoided that a stolen document is read by another scanner. However, in the second embodiment where the associated information is stored in the server 20 in place of the scanner X, regardless of which scanner among those connected to the server 20 through the network is used in the reading of the document, the document image is collated with yet-processed images accumulated in the server 20. This allows, as described later, the server 20 to determine that a document is stolen one when the stolen document is read by any one of the scanners.

In step S160, when the document image read in step S140 matches with image information contained in any past associated information, and when the fingerprint information of the operator read in step S130 also matches with the fingerprint information contained in the past associated information (S161), the procedure of the control unit 1 of the scanner X goes to step S180. This is because the same associated information has been generated in the past and remains in the storage unit 21 of the server 20, that is, the associated information need not be generated newly.

However, in step S161, when the fingerprint information of the operator does not match with the fingerprint information contained in the past associated information, it is concluded that another person is trying to read the document image. In this case, the document is determined as stolen one, so that a message is displayed indicating that the reading of the document is not permitted (a stolen document may be notified) (S162). Then, the image processing by the scanner X is completed.

Figure 5B:
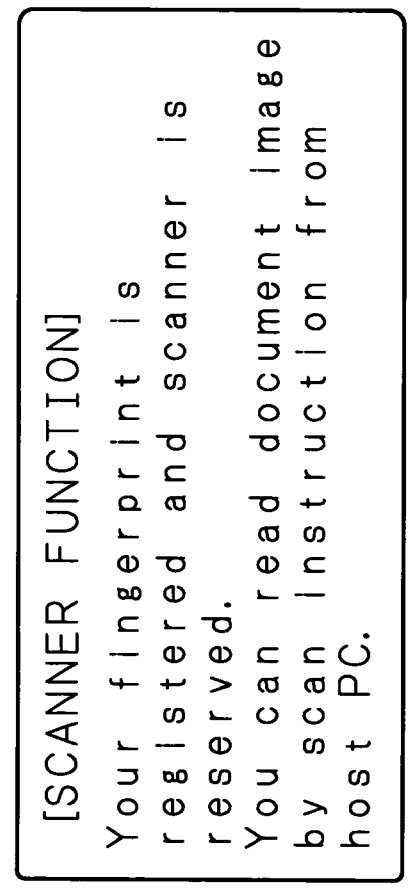

In step S180, the control unit 1 of the scanner X displays a message indicating that the reading of the document having been set on the document image reading unit 13 is permitted (see FIG. 5B). On confirming this message of the scanner X, the operator leaves the scanner X and goes to the host PC 30, so as to give an operation instruction from the host PC 30 to the scanner X.

The operator selects the scanner driver at the host PC 30 (S181), and then causes the host PC 30 to read the operator's own fingerprint information (S182). Here, the fingerprint information of the operator is read when the fingerprint of the operator is contacted to the fingerprint reading unit 31 of the host PC 30. Then, the operator transmits an operation instruction to the scanner X (S183), so as to start the reading of the document image. This operation instruction transmitted in step S183 is issued preferably at the same time as the reading of the fingerprint information performed in step S182. This eliminates the inputting work of the operation instruction, and hence improves the operability.

The control unit 1 of the scanner X judges whether the fingerprint information has been read at the host PC 30 in step S182 and whether the operation instruction has been inputted in step S183 (S200 and S210). When it is judged that both of the fingerprint information and the operation instruction have been inputted, the control unit 1 of the scanner X collates the fingerprint information read in step S130 with the fingerprint information read in step S182 (S220). When both pieces of the fingerprint information match with each other (S230), the control unit 1 of the scanner X reconfirms that the document is present on the document image reading unit 13, by means of the document sensor 12 (S240). Then, the control unit 1 starts the reading of the document image on the basis of reading conditions specified by the operator. On completion of the reading, the control unit 1 transmits the read document image information to the host PC 30 having issued the reading operation instruction (S250).

The confirmation of the presence or absence of the document in step S240 by the document sensor 12 is preferably continued from the time point when the message of reading permission is displayed in step S180 until it is judged that an operation end instruction is issued in step S260.

In step S240, when no document is present on the document image reading unit 13, the control unit 1 of the scanner X transmits, in step S241, a warning indicating the situation (this may be a warning of the occurrence of theft) to the host PC 30, and display the warning on the operation panel of the operation and display unit 10 of the scanner X (see FIG. 5D). In such case, the associated information stored in the server 20 is not deleted, while this image processing is completed.

The document image information transmitted in step S250 is received by the host PC 30 (S184). The operator of the host PC 30 checks the image and, when desired image is acquired, transmits an operation end instruction to the scanner X (S186). When the scanner X receives the operation end instruction (S260), the scanner X instructs the server 20 to delete the associated information corresponding to the document image from the storage unit 21 thereof (S270). Then, the image processing is completed. As such, the associated information corresponding to the document image is deleted from the storage unit 21 of the server 20, thereby avoiding the risk of leakage of the fingerprint information.

The timer 14 provided in the scanner X starts time counting operation at the time point when the message of reading permission is displayed in step S180. The time counting is continued until it is judged that an operation end instruction is issued in step S260. When a predetermined time has elapsed, the control unit 1 transmits, at the time point of the completion of the step S270, a warning indicating that the image processing by the scanner X is interrupted forcedly to the host PC 30.

At the same time, the control unit 1 displays the warning (see FIG. 5C) on the operation panel of the operation and display unit 10 of the scanner X. These warning messages will be helpful to the operator.

The second embodiment has been described for the configuration that the storage unit 21 provided in the server 20 stores the fingerprint information, the document image information, and the associated information. However, the abovementioned information need not be stored in such a storage unit 21 provided in the server, and may be stored in any storage unit connected to the network in a manner permitting communications with the scanner X and the host PC 30.

Further, the fingerprint information, the document image information, and the associated information need not be stored in the same storage unit. For example, the fingerprint information and the document image information may be temporarily stored in a storage unit such as a hard disk drive or a memory in the scanner X or the host PC 30, while the associated information where these pieces of information are associated with each other may be stored in another storage unit on the network. In this case, the fingerprint information and the document image information stored temporarily are deleted preferably at the time of generation of the associated information.

The document image reading unit 13 may read the document image at a predetermined resolution. In the case where the document image reading unit 13 is set so as to read at a low resolution, reading time is reduced, and image processing is performed efficiently.

An apparatus of the invention may perform the OCR processing of a document image, so as to extract character information (character data) exclusively. Documents read by the scanner can include texts as well as photographs and images. In this case, keywords may be extracted from the text information obtained from such text documents. Then, the keywords may be collated with associated information. This permits efficient collation of text documents.

The document may be read in a manner divided into a plurality of blocks. Even in case that a document is identified as the same document by a simple scan and read operation, the document can be identified as a different one depending on the direction or the region of the setting of the document. Thus, when the document is read in a manner divided into a plurality of blocks, and for example when even one block matches with a part of image information contained in associated information, the document may be determined as the same document. This realizes efficient document image collation.

As described above in detail, according to the invention, fingerprint information read by a scanner is collated with fingerprint information read by a terminal apparatus used by an operator. This realizes an image processing system where fingerprint information need not be registered in advance, and where operators of the scanner are not limited. Further, the invention prevents an operator other than the intrinsic owner of a document from reading illicitly the document image.

Further, according to the invention, the fingerprint information stored in the time of scanner operation is deleted on end of the scanner operation. Thus, the fingerprint information regarded as important personal information is stored only for a limited time. This reduces the risk of leakage of the fingerprint information, as much as possible. This resolve the concern owned by fingerprint information registered persons in the conventional case that the fingerprint information is stored for a long time. As a result, high security and operability are obtained.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image processing system including:

a scanner for reading a document image;

a terminal apparatus connected to said scanner in a manner permitting communications so as to transmit an operation instruction to said scanner; and a server including associated information storing means for storing associated information in which unprocessed document information and fingerprint information are associated with each other, the server being connected to said scanner and said terminal apparatus in a manner permitting communications, wherein said scanner comprises:

first fingerprint information reading means for reading fingerprint information of an operator;

first fingerprint information storing means for storing temporarily the fingerprint information read by said first fingerprint information reading means, document image reading means for reading a document image so as to collate said document image with the associated information of a past time stored in the associated storing means of the server;

collating means for collating the fingerprint information stored in the first fingerprint information storing means and fingerprint information contained in the associated information of the past time, and for collating the document image information read by the document image reading means and the document image information contained in the associated information of the past time; and means for generating new associated information in which the fingerprint information read by the first fingerprint information reading means and the document image information read by the document image reading means are associated with each other, and for storing the newly generated associated information in the associated information storing means of the server when the document image information read by the document image reading means and the document image information contained in the associated information of the past time does not match;

said terminal apparatus comprises:

second fingerprint information reading means for reading second fingerprint information of the operator or a different operator; and second fingerprint information storing means for storing temporarily the second fingerprint information read by said second fingerprint information reading means; wherein when the associated information newly generated by the scanner is stored in the associated information storing means of the server, or when the document image information read by the document image reading means and the fingerprint information read by the first fingerprint information reading means matches the document image information and the fingerprint information contained in the associated information of the past time, respectively, fingerprint information collating means for collating the fingerprint information stored in said first fingerprint information storing means with the second fingerprint information read by said second fingerprint information reading means by means of communications between said scanner and said terminal apparatus, and operation permitting means for permitting the operation of said scanner in response to the operation instruction inputted through said terminal apparatus on the basis of the result of collation in said fingerprint information collating means are provided either in said scanner or in said terminal apparatus, or alternatively any one of said fingerprint information collating means and said operation permitting means is provided in said scanner while the other one is provided in said terminal apparatus, and when the operation is permitted by the operation permitting means and a reading operation of a document is completed by the scanner, or when a predetermined time has elapsed before the reading operation is completed, the associated information generated and stored in the associated information storing means of the server for the document is deleted together with the fingerprint information stored in the scanner and the terminal device.

2. The image processing system as set forth in claim 1, wherein when collation by said fingerprint information collating means results in a match, said operation permitting means permits the operation of said scanner in response to the operation instruction inputted through said terminal apparatus.

3. The image processing system as set forth in claim 1, wherein operation inhibiting means for inhibiting the operation of said scanner is provided in either said scanner or said terminal apparatus, when the document image information read by the document image reading means and the document image information contained in the associated information of the past matches, and when the fingerprint information read by the first fingerprint information reading means and the fingerprint information contained in the associated information does not match.

4. The image processing system as set forth in claim 1, wherein when a document is removed before the reading operation of the document by said scanner is completed, the associated information generated for the removed document is not deleted.

5. A scanner connected to a server including associated information storing means for storing associated information in which unprocessed document information and fingerprint information are associated with each other, and to a terminal apparatus for transmitting an operation instruction for reading a document image in a manner permitting communications, comprising:

fingerprint information reading means for reading a fingerprint information of an operator;

fingerprint information storing means for temporarily storing the fingerprint information read by said fingerprint information reading means;

document image reading means for reading a document image so as to collate said document image with the associated information of a past time stored in the associated storing means of the server;

collating means for collating the fingerprint information stored in the fingerprint information storing means and fingerprint information contained in the associated information of the past time, and for collating the document image information read by the document image reading means and the document image information contained in the associated information of the past time;

means for generating new associated information in which the fingerprint information read by the fingerprint information reading means and the document image information read by the document image reading means are associated with each other, and for storing the newly generated associated information in the associated information storing means of the server when the document image information read by the document image reading means and the document image information contained in the associated information of the past time does not match; and fingerprint information collating means for collating the fingerprint information read by said fingerprint information reading means with a fingerprint information acquired by said terminal apparatus by means of communications with said terminal apparatus, when the associated information newly generated by the scanner is stored in the associated information storing means of the server, or when the document image information read by the document image reading means and the fingerprint information read by the fingerprint information reading means matches the document image information and the fingerprint information contained in the associated information of the past time, respectively; and operation permitting means for permitting the operation in response to the operation instruction inputted through said terminal apparatus on the basis of the result of collation by said fingerprint information collating means, when the operation is permitted by the operation permitting means and a reading operation of a document is completed by the scanner, or when a predetermined time has elapsed before the reading operation is completed, the fingerprint information stored in the scanner is deleted together with the associated information generated and stored in the associated information storing means of the server for the document.

6. The scanner as set forth in claim 5, wherein when a document is removed before the reading operation of the document is completed, the fingerprint information from said fingerprint information storing means is not deleted.

7. A terminal apparatus connected to both a scanner for reading a document image and a server including associated information storing means for storing associated information in which unprocessed document information and fingerprint information are associated with each other in a manner permitting communications so as to transmit an operation instruction for causing said scanner to read a document image, comprising:

fingerprint information reading means for reading a fingerprint information of an operator;

fingerprint information storing means for temporarily storing the fingerprint information read by said fingerprint information reading means;

fingerprint information collating means for collating a fingerprint information acquired by said scanner with the fingerprint information read by said fingerprint information reading means by means of communications with said scanner when a new associated information in which the fingerprint information acquired by the scanner and the document image information are associated with each other are stored in the associated information storing means of the server, or when the fingerprint information and the document image information matches the fingerprint information and the document image information contained in the associated information of the past stored in the associated information storing means, respectively; and operation permitting means for permitting the operation of said scanner in response to the inputted operation instruction on the basis of the result of collation in said fingerprint information collating means, wherein when the operation is permitted by the operation permitting means and a reading operation of a document is completed by the scanner, or when a predetermined time has elapsed before the reading operation is completed, the fingerprint information stored in the terminal apparatus is deleted together with the associated information generated and stored in the associated information storing means of the server for the document.

8. The terminal apparatus as set forth in claim 7, wherein when a document is removed from said scanner before the reading operation of the document is completed, the fingerprint information generated for the removed document from said fingerprint information storing means is not deleted.

* * * * *